(12) United States Patent
Darraba

(10) Patent No.: US 9,505,378 B2
(45) Date of Patent: Nov. 29, 2016

(54) DRIVE ARRANGEMENT

(71) Applicant: Autoliv Development AB, Vårgårda (SE)

(72) Inventor: Roger Darraba, Montesson (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/391,528

(22) PCT Filed: Jan. 25, 2013

(86) PCT No.: PCT/EP2013/000221
§ 371 (c)(1),
(2) Date: Oct. 9, 2014

(87) PCT Pub. No.: WO2013/159842
PCT Pub. Date: Oct. 31, 2013

(65) Prior Publication Data
US 2015/0088384 A1    Mar. 26, 2015

(30) Foreign Application Priority Data
Apr. 23, 2012   (EP) .................................... 12165128

(51) Int. Cl.
*B60R 22/00* (2006.01)
*E05F 15/00* (2015.01)
(Continued)

(52) U.S. Cl.
CPC ................. *B60R 22/46* (2013.01); *H02P 4/00* (2013.01); *H02P 7/04* (2016.02); *H02P 29/025* (2013.01); *H02P 29/032* (2016.02); *B60R 2022/4666* (2013.01)

(58) Field of Classification Search
CPC ........ H02P 2101/30; H02P 3/14; H02P 4/00; H02P 2209/07; H02P 25/025; H02P 25/22; H02P 29/22; H02P 29/025; H02P 25/024; H02P 7/06; H02P 9/48; H02P 6/20; H02P 7/29; H02P 7/04; H02P 9/08; B60R 2022/4666; B60R 16/03; B60R 22/46; B60R 16/037; B60R 16/033
USPC .................. 701/45, 22, 68, 42, 112, 36; 180/65.275, 65.28, 65.285, 65.1, 180/65.25, 443, 65.29, 65.21, 65.22
See application file for complete search history.

(56) References Cited

U.S. PATENT DOCUMENTS

| 4,655,312 | A | * | 4/1987 | Frantom | .................. B60R 22/44 180/268 |
| 4,840,324 | A | * | 6/1989 | Higbee | ................... B60R 22/44 242/385.4 |

(Continued)

FOREIGN PATENT DOCUMENTS

| EP | 1 314 623 B1 | 2/2005 |
| EP | 2 432 097 A2 | 3/2012 |
| WO | WO 2008/157389 A1 | 12/2008 |

OTHER PUBLICATIONS

International Search Report—Jan. 27, 2014.
(Continued)

*Primary Examiner* — Calvin Cheung
*Assistant Examiner* — Luis A Martinez Borrero
(74) *Attorney, Agent, or Firm* — Brinks Gilson & Lione

(57) ABSTRACT

A drive arrangement (1) comprising an input (2) from a primary power source (5) and an auxiliary power source (7). The drive arrangement (1) incorporates a DC-DC converter (8) and a motor driver circuit (14). The motor driver circuit (14) is connected to a motor (18) in a motorized seat belt retractor. The drive arrangement (1) drives the motor (18) in the event of a crash situation. If the connection between the drive arrangement (1) and the primary power source (5) is lost then the drive arrangement (1) draws power from the auxiliary power source (7) to drive the motor (18). The auxiliary power source (7) can also assist the primary power source (5) by limiting the current drawn from the primary power source (5).

8 Claims, 5 Drawing Sheets

(51) Int. Cl.
*G05D 1/00* (2006.01)
*G05D 3/00* (2006.01)
*G06F 7/00* (2006.01)
*G06F 17/00* (2006.01)
*B60R 22/46* (2006.01)
*H02P 29/02* (2016.01)
*H02P 4/00* (2006.01)

(56) References Cited

U.S. PATENT DOCUMENTS

| | | | | | |
|---|---|---|---|---|---|
| 4,874,995 | A * | 10/1989 | Kawai | | H02H 7/08 318/484 |
| 5,005,777 | A * | 4/1991 | Fernandez | | B60R 22/44 242/370 |
| 5,146,104 | A * | 9/1992 | Schumacher | | F42D 1/045 280/735 |
| 5,183,291 | A * | 2/1993 | Shah | | B60R 22/06 280/804 |
| 5,201,385 | A * | 4/1993 | Browne | | B60R 21/013 180/268 |
| 5,398,185 | A * | 3/1995 | Omura | | B60R 21/01538 180/268 |
| 5,506,775 | A * | 4/1996 | Tsurushima | | B60R 21/0132 280/735 |
| 5,605,202 | A * | 2/1997 | Dixon | | B60R 21/01 180/268 |
| 5,700,034 | A * | 12/1997 | Lane, Jr. | | B60R 22/28 280/805 |
| 5,710,699 | A | 1/1998 | King et al. | | |
| 5,775,618 | A * | 7/1998 | Krambeck | | B60R 22/44 242/372 |
| 5,777,225 | A * | 7/1998 | Sada | | B60R 21/0132 180/282 |
| 5,806,008 | A * | 9/1998 | Takeuchi | | B60R 21/017 280/734 |
| 5,816,522 | A * | 10/1998 | Krambeck | | B60R 22/44 242/375.3 |
| 5,835,873 | A * | 11/1998 | Darby | | B60R 21/01 180/268 |
| 5,929,535 | A * | 7/1999 | Fendt | | B60R 21/017 180/268 |
| 6,533,054 | B1 * | 3/2003 | Fey | | B60K 1/02 180/342 |
| 6,614,129 | B1 * | 9/2003 | Mattes | | B60R 21/017 280/735 |
| 6,726,249 | B2 * | 4/2004 | Yano | | B60R 22/46 180/268 |
| 6,737,819 | B2 * | 5/2004 | Tanji | | B60R 22/44 180/268 |
| 6,791,463 | B2 * | 9/2004 | Iwasaki | | E05B 77/12 340/635 |
| 6,827,308 | B2 * | 12/2004 | Fujii | | B60R 22/44 180/268 |
| 6,963,497 | B1 * | 11/2005 | Herbert | | H02M 3/07 363/133 |
| 7,128,343 | B2 * | 10/2006 | Ingemarsson | | B60R 21/0134 280/805 |
| 7,482,766 | B2 * | 1/2009 | Kuwada | | H02P 1/54 318/109 |
| 7,503,580 | B2 * | 3/2009 | Munch | | B60R 21/01564 280/735 |
| 7,726,693 | B2 * | 6/2010 | Koide | | B60R 22/02 180/268 |
| 7,755,213 | B2 * | 7/2010 | Ang | | B60K 6/445 307/10.1 |
| 7,766,117 | B2 * | 8/2010 | Saito | | B60R 22/46 180/268 |
| 7,772,714 | B2 * | 8/2010 | Hattori | | H02J 9/061 307/10.1 |
| 7,775,473 | B2 * | 8/2010 | Mori | | B60R 22/46 242/374 |
| 7,828,105 | B2 * | 11/2010 | Odate | | B60R 22/46 180/268 |
| 8,262,129 | B2 * | 9/2012 | Fukawatase | | B60R 21/0136 280/739 |
| 8,620,504 | B2 * | 12/2013 | Komata | | B60K 6/365 180/65.31 |
| 8,853,888 | B2 * | 10/2014 | Khaligh | | H02M 1/10 307/52 |
| 8,872,485 | B1 * | 10/2014 | Kung | | H02M 3/1582 323/222 |
| 9,013,125 | B2 * | 4/2015 | Kitanaka | | B60L 7/14 318/376 |
| 9,061,638 | B2 * | 6/2015 | Sievers | | B60R 21/017 |
| 2005/0179424 | A1 * | 8/2005 | Mayumi | | H02M 3/1563 323/282 |
| 2005/0254273 | A1 * | 11/2005 | Soudier | | H02M 3/335 363/103 |
| 2006/0152085 | A1 * | 7/2006 | Flett | | B60L 9/30 307/75 |
| 2008/0246452 | A1 * | 10/2008 | Sievers | | B60R 21/017 323/282 |
| 2009/0066277 | A1 * | 3/2009 | Ang | | B60L 11/1803 318/400.17 |
| 2009/0267580 | A1 * | 10/2009 | Derksen | | H02M 3/157 323/282 |
| 2009/0284080 | A1 * | 11/2009 | Kojima | | B60L 11/1881 307/85 |
| 2009/0315401 | A1 * | 12/2009 | Yoshida | | H02J 9/061 307/44 |
| 2013/0124051 | A1 * | 5/2013 | Sievers | | B60R 21/017 701/45 |

OTHER PUBLICATIONS

European Examination Report—Jan. 21, 2013.

* cited by examiner

DRIVE ARRANGEMENT

CROSS REFERENCE TO RELATED APPLICATIONS

This application relates to European Patent Application No. 12165128.5, filed Apr. 23, 2012 and PCT/EP2013/000221, filed Jan. 25, 2013.

FIELD OF THE INVENTION

The present invention relates to a drive arrangement and more particularly relates to a drive arrangement for driving an electric motor in a motorized seat belt retractor. The seatbelt retractor may function as an electrical belt force limiter.

A motorized seat belt retractor is installed in a vehicle to wind in the slack in a seat belt in the event that the vehicle is involved in a crash situation (known as a pretensioner or pre-pretensioner function). The motorized retractor winds in the slack to pull the seat belt taught against an occupant wearing the seat belt so that the occupant is restrained correctly during the crash situation. The motorized retractor may also be used to limit the force on the seatbelt during or after the crash situation by allowing a payout of the belt to limit the deceleration of the occupant.

During normal vehicle operation, a conventional motorized seat belt retractor is connected to receive power from the vehicle's battery via the vehicle's electrical system. However, in a crash situation, the power supply connection between the vehicle's battery and the motorized retractor may be broken. In this instance, the motorized retractor is not able to function because the motor in the retractor is no longer connected to a source of power.

In other situations, the power supply connection between the vehicles battery and the motorized retractor may not be broken. In this case, the motorized retractor will operate correctly but the pulse of high current drawn by the retractor may disturb other electronic components in the vehicle.

There is a need for a drive arrangement to drive a motorized seat belt retractor so that the motorized retractor operates correctly during a crash situation when the motorized retractor is disconnected from the battery. There is also a need for a drive arrangement to supply a current to a motorized retractor to minimise the high current pulse in the vehicle's electrical system.

BRIEF DESCRIPTION OF THE INVENTION

The present invention seeks to provide an improved drive arrangement.

According to one aspect of the present invention, there is provided a drive arrangement for driving a motor in a vehicle safety device, the arrangement including a power supply input configured to be connected to a primary power source, an auxiliary power source, a DC-DC converter circuit configured to operate in at least a voltage boost mode, the DC-DC converter circuit having an input that is connected to the auxiliary power source, a motor driver circuit having an input that is connected to an output of the DC-DC converter circuit and to the power supply input, and a control unit connected to the DC-DC converter circuit. The control unit being configured to activate the DC-DC converter circuit to operate in the voltage boost mode to increase the voltage input to the motor driver circuit if the voltage at the input to the motor driver circuit is below a predetermined level.

Preferably, the auxiliary power source is a supercapacitor.

Conveniently, the supercapacitor has a plurality of supercapacitor cells.

Advantageously, a shunt regulator is provided across each supercapacitor cell to regulate the voltage and current applied to each cell.

Preferably, the drive arrangement incorporates a voltage and current limiter to limit the voltage and current input to the supercapacitor.

Conveniently, the DC-DC converter circuit is a bi-directional converter that is also configured to operate in a buck convertor mode which, when activated, reduces the voltage of the primary power source to a lower level and inputs the reduced voltage into the supercapacitor.

Advantageously, the control unit is connected to control switches in the DC-DC converter circuit and the control unit is configured to modulate the switches in the DC-DC converter circuit so that the DC-DC converter circuit operates in either the buck mode or the boost mode in response to the sensed primary power source voltage and the sensed voltage across the supercapacitor.

Preferably, the control unit is configured to receive a signal from a crash sensor which is indicative of a crash situation or an anticipated crash situation.

Conveniently, the drive arrangement is connected to a motor in a motorised seat belt retractor.

Advantageously, the drive arrangement incorporates a speed sensor to sense the speed of rotation of the motor and output a speed signal to the control unit which is indicative of the speed of rotation of the motor.

Preferably, the motor driver circuit is an H-bridge motor driver circuit.

According to another aspect of the present invention, there is provided a seat belt retractor connected to a drive described herein.

Preferably the seat belt retractor is operable as a load limiter.

BRIEF DESCRIPTION OF THE DRAWINGS

In order that the invention may be more readily understood, and so that further features thereof may be appreciated, embodiments of the invention will now be described, by way of example, with reference to the accompanying drawings in which.

DETAILED DESCRIPTION OF THE INVENTION

Figure 1:
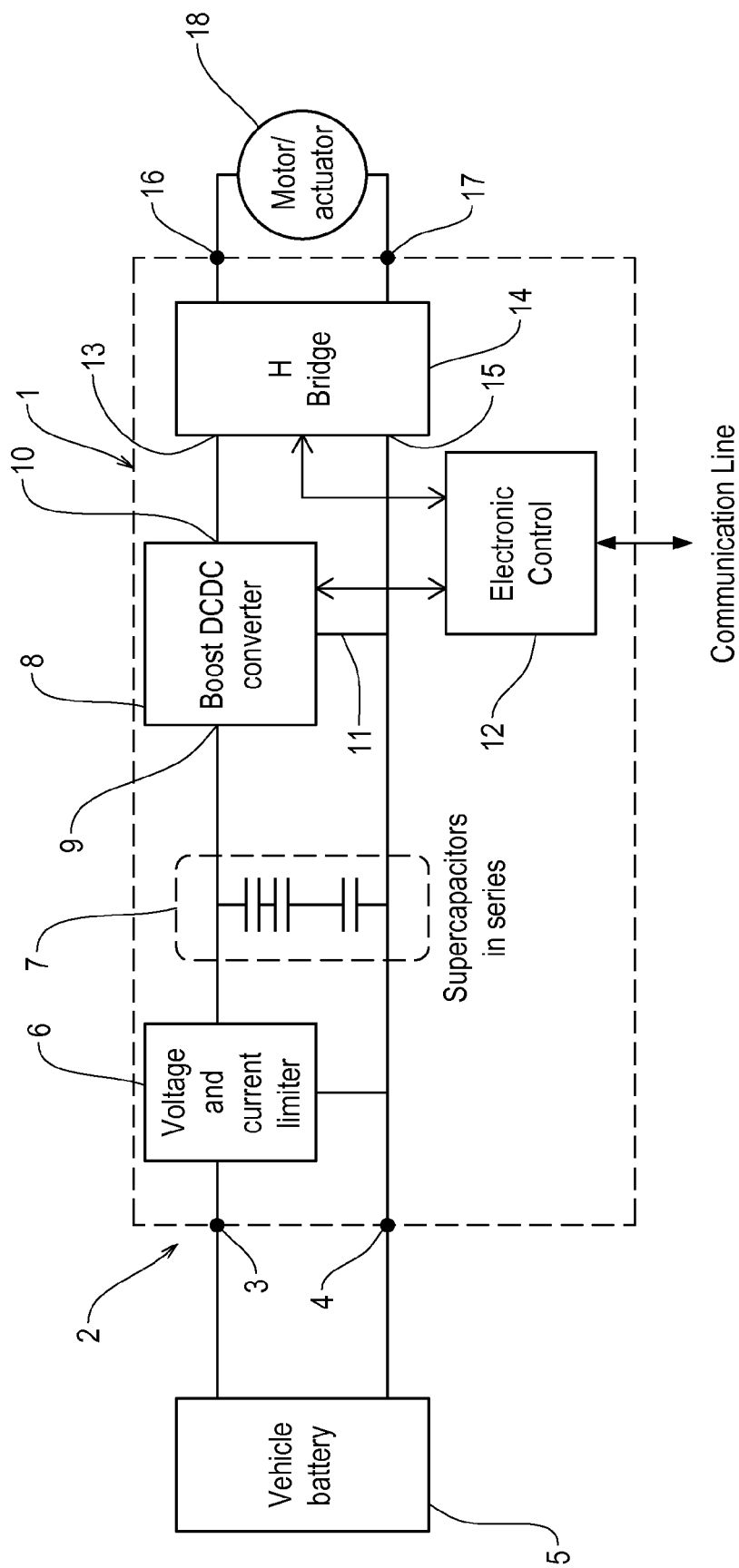
FIG. 1 is a schematic view of a drive arrangement in accordance with an embodiment of the invention with the drive arrangement connected to a vehicle battery and a motor.

Referring initially to FIG. 1 of the accompanying drawings, a drive arrangement 1 in accordance with a preferred embodiment of the invention incorporates a power supply input 2 including a positive input terminal 3 and a ground input terminal 4. The terminals 3, 4 of the power supply input 2 are connected, in use, to the primary electrical power source in a vehicle, such as a vehicle battery 5.

The drive arrangement 1 of this embodiment of the invention incorporates a voltage and current limiter 6 which limits the voltage and current drawn from the vehicle battery 5.

The drive arrangement 1 incorporates an auxiliary power source in the form of a supercapacitor 7. The supercapacitor 7 is connected between the positive power rail and the ground power rail of the drive arrangement 1. The supercapacitor 7 preferably includes a plurality of supercapacitor cells that are connected in series. However, in other embodiments, the auxiliary power source is a single supercapacitor or single supercapacitor cell.

The drive arrangement 1 incorporates a voltage boost circuit 8 which is connected in parallel with the supercapacitor 7. The voltage boost circuit 8 is a DC-DC converter which has a positive voltage input 9, a positive voltage output 10, and a ground connection 11. The voltage boost circuit 8 is connected to a control unit 12 which is configured to control the voltage boost circuit 8 to boost the voltage input to the positive voltage input terminal 9 to a higher voltage.

The positive voltage output 10 of the voltage boost circuit 8 is connected to an input 13 of a motor driver circuit 14. The motor driver circuit 14 also incorporates a ground input 15 which is connected to the ground rail of the drive arrangement 1. The motor driver circuit 14 is preferably an H-bridge circuit. The motor driver circuit is connected to the control unit 12 to receive control signals from the control unit 12.

The motor driver circuit 14 incorporates output terminals 16, 17 that are connected in use to an electric motor 18 inside a motorized seat belt retractor (not shown). In one embodiment, the motorized seat belt retractor is configured to function as a load limiter to limit the force on a seatbelt by allowing pay-out of the seat belt to limit the deceleration of an occupant wearing the seat belt.

The supercapacitor 7 is preferably an electric double-layer capacitor (EDLC) which is also known as a supercondenser, pseudocapacitor, or ultracapacitor. The supercapacitor 7 has a relatively high energy density as compared with a conventional electrolytic capacitor. In embodiments of the invention, the supercapacitor 7 is preferably rated at 0.4 F and 16V or greater. In a preferred embodiment, the supercapacitor 7 includes six supercapacitor cells each of 2.75V and 2.4 F. The capacitor voltage is preferably between 2V and 2.75V, depending on the supercapacitor technology and the operating temperature.

Figure 2:
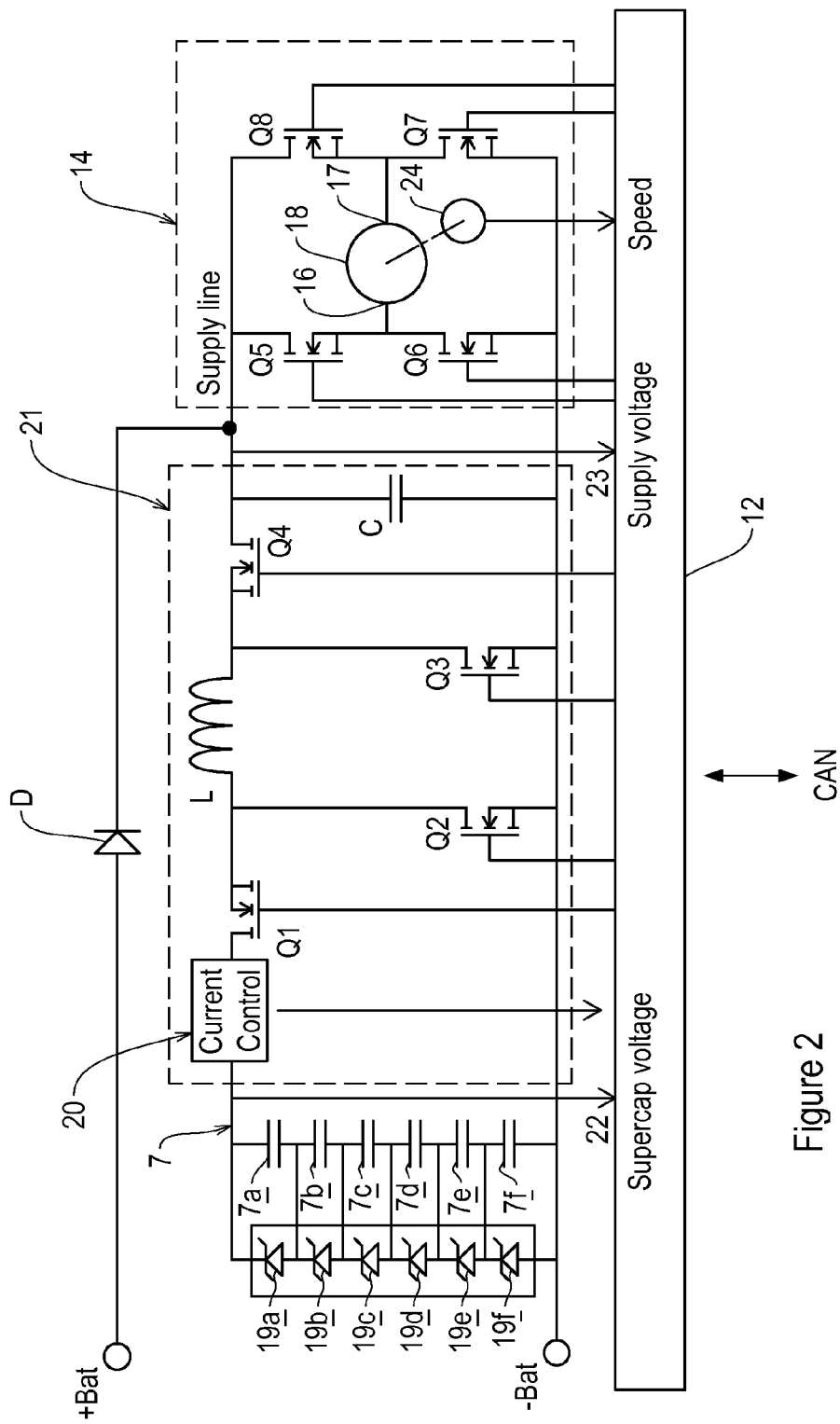
FIG. 2 is a schematic circuit diagram of an embodiment of the invention.

Referring now to FIG. 2 of the accompanying drawings, the supercapacitor 7 is preferably formed from six supercapacitor cells 7a-f that are connected in series. A shunt regulator such as a zener diode 19a-f is preferably connected across each supercapacitor cell 7a-f to regulate the voltage across each supercapacitor cell 7a-f. The shunt regulator zener diodes 19a-f preferably regulate the voltage across each supercapacitor cell 7a-f to between 2V and 2.75V.

The drive arrangement 1 preferably incorporates a current control device 20 which regulates the current supplied to the supercapacitor 7. In one embodiment, the current control device 20 limits the current supplied to the supercapacitor 7 to 2A. The supercapacitor cells 7a-f therefore preferably charge in less than 4 seconds.

In this preferred embodiment, the voltage boost circuit 8 forms part of a combined bi-directional buck-boost DC-DC converter 21. The DC-DC converted incorporates four switches Q1-Q4 that are preferably field effect transistors (FET). The DC-DC converter 21 further includes an inductor L which is preferably of 3.3 pH with an operating current capability of at least 40 A. The DC-DC converter 21 also incorporates a capacitor C which is preferably of 1000 µF with an operating voltage of at least 25V.

Each of the switches Q1-Q4 is connected to the control unit 12 to receive switching signals from the control unit 12 to switch the switches Q1-Q4 on and off. The control unit 12 incorporates at least one voltage sensor which is connected to the positive voltage rail at the positive voltage end of the supercapacitor 7 as indicated by arrow 22 and to the positive voltage rail at the output of the DC-DC converter 21 as indicated by arrow 23. The control unit 12 is also connected to the current control device 20 so that the control unit 12 controls the current control device 20.

The output of the DC-DC converter 21 is connected to the high and low voltage rails of the motor driver circuit 14. The motor driver circuit 14 is preferably an H-bridge circuit which includes four switches Q5-Q8 that are connected in an H-bridge arrangement. The output terminals 16, 17 of the H-bridge arrangement are, in use, connected to a motor 18. A speed sensor 24 is preferably connected to the motor 18 to sense the speed of rotation of the motor 18. The speed sensor 24 is connected to the control unit 12 to transmit a signal indicative of the speed of the motor 18 to the control unit 12.

The vehicle battery 5 is connected to the positive voltage rail of the motor driver circuit 14 via a diode D. The diode D is preferably a power diode which is capable of operating at a current of up to 20 A and preferably at a current greater than 20 A. The control unit 12 is preferably connected to the vehicle's controller area network (CAN) so that the control unit 12 receives control signals from the vehicle's main control system. The control unit 12 is preferably connected to a crash sensor which is configured to sense a crash situation or an anticipated crash situation.

In operation, the control unit 12 senses the voltage provided by the vehicle battery 5 which is primary power source. The control unit 12 also senses the voltage across the supercapacitor 7. In this embodiment, the control unit 12 is configured to switch the switches Q1-Q4 in the DC-DC converter 8 to charge the supercapacitor 7 with a 2A current when the supply voltage from the battery 5 is greater than 12V and the voltage across the supercapacitor 7 is less than 16.5V. The control unit 12 is configured to operate the switches Q1-Q4 so that the DC-DC converter 8 provides a supply line voltage of preferably 12V to the H-bridge motor driver circuit 14.

The control unit 12 modulates the switches Q1-Q4 automatically so that the DC-DC converter circuit 8 operates in either a boost mode or a buck mode depending on the supply voltage from the battery 5 and the voltage across the supercapacitor 7. For instance, when the supply voltage from the battery 5 is less than 12V, the control unit 12 activates the DC-DC converter 8 to increase or decrease the voltage of the auxiliary power source originating from the supercapacitor 7 to maintain a 12V supply voltage to the motor driver circuit 14.

Figure 3:
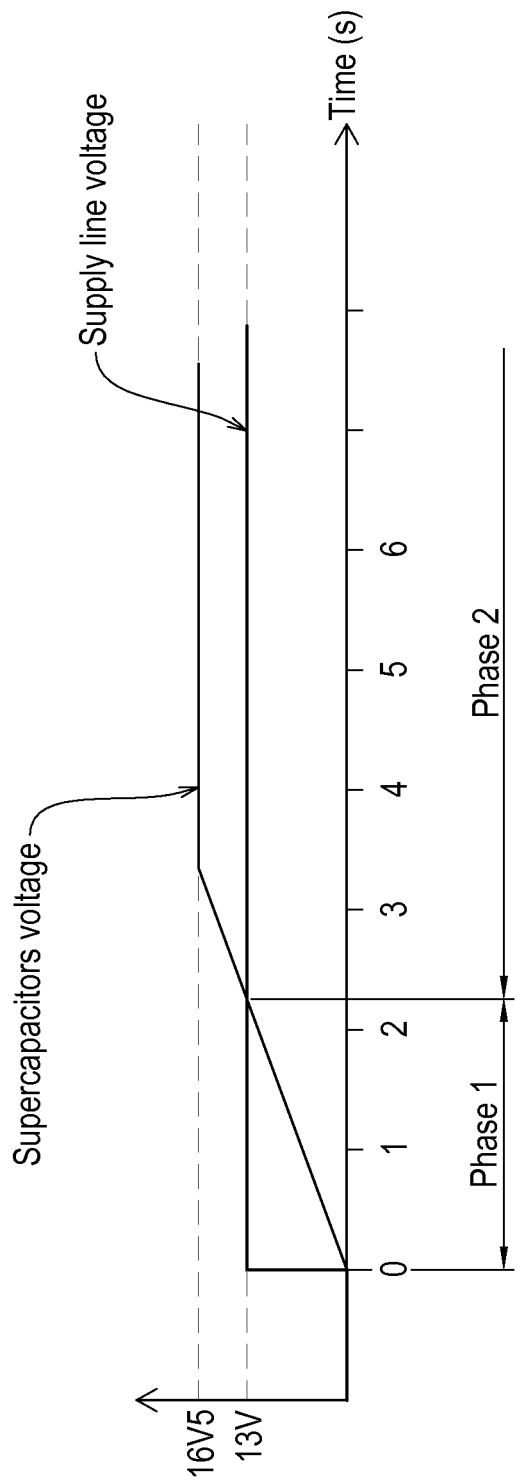
FIG. 3 is a graphical representation of a supercapacitor charging during normal vehicle operation.

Referring now to FIG. 3 of the accompanying drawings, the DC-DC converter circuit 8 operates in two phases when the vehicle is operating normally.

Phase 1: Buck Mode from the Power Supply Line to the Supercapacitor

When the control unit 12 senses that the voltage across the supercapacitor 7 is less than the supply line voltage from the battery 5, the control unit 12 operates the DC-DC converter 8 in a buck mode to charge the supercapacitor 7 with current drawn from the vehicle battery 5. The control unit 12 modulates switch Q4 with a pulse width modulation (PWM) signal to turn switch Q4 on and off. The control unit 12 modulates switch Q3 with a complimentary PWM signal so that switch Q3 acts as a synchronised rectification diode. The control unit 12 turns switch Q1 on and switch Q2 off. The control unit 12 controls the current supplied to the supercapacitor 7 by controlling the duty cycle of the PWM signals applied to switches Q3 and Q4.

Phase 2: Boost Mode from Power Supply Line to Supercapacitor

The control unit 12 turns switch Q4 on and switch Q3 off. The control unit 12 modulates switch Q2 with a PWM signal and modulates switch Q1 with a complimentary PWM signal so that switch Q1 acts as a synchronised rectification diode. The current supplied from the supply line to the supercapacitor is controlled by the duty cycle of the PWM modulation of switches Q1 and Q2.

The control unit 12 controls the DC-DC converter 8 to operate in either phase 1 or phase 2 during normal vehicle operation so that the DC-DC converter 8 automatically switches between buck and boost modes to keep the supercapacitor 7 charged.

Figure 4A:
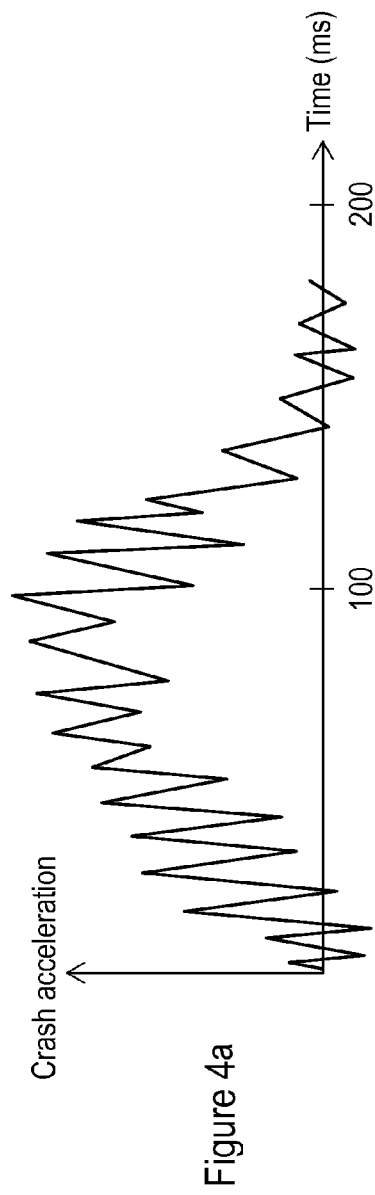
FIG. 4a is a graphical representation of the acceleration of a vehicle during a typical crash situation.
Figure 4B:
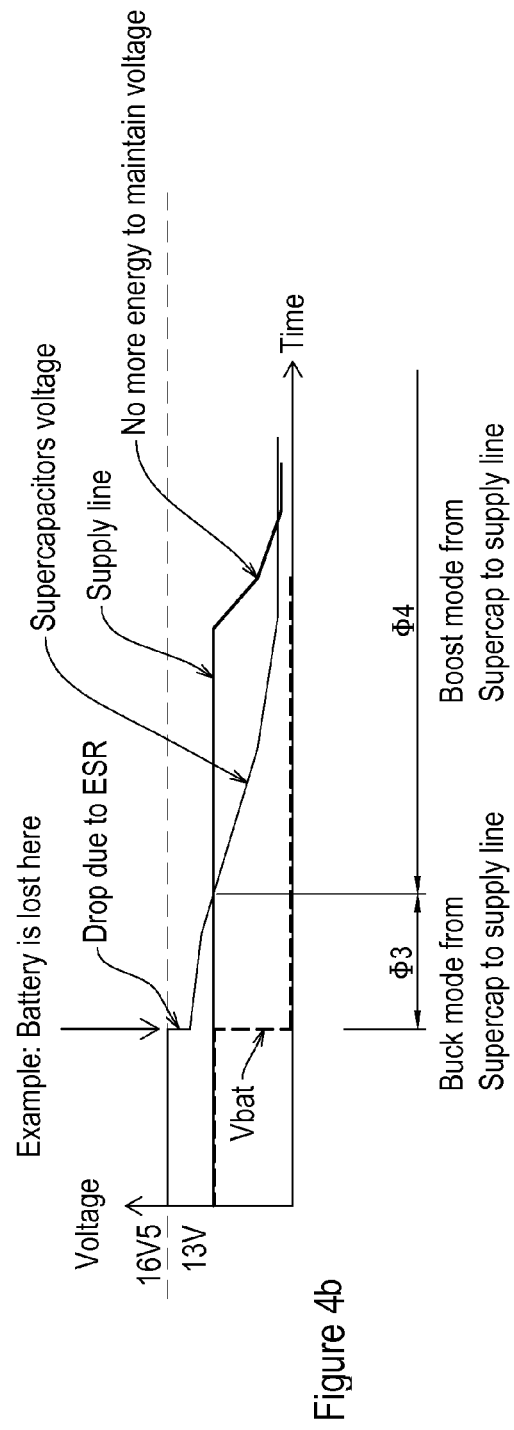
FIG. 4b is a graphical representation of the supply line voltage and the supercapacitor voltage of an embodiment of the invention during a crash situation.

If the vehicle is involved in a crash situation, the vehicle is subjected to forces that accelerate and decelerate the vehicle in a manner shown approximately in FIG. 4a. The primary power source connection between the battery 5 and the drive unit 1 may be broken during the crash situation so that there is no voltage input from the battery 5. The loss of the battery voltage is represented graphically in FIG. 4b. There is an immediate drop in the voltage input to the H-bridge circuit 14 when the voltage from the battery is lost as a result of the equivalent series resistance (ESR) of the components in the drive arrangement 1.

The control unit 12 senses the drop in the voltage from the battery 5 and activates the DC-DC converter 8 to operate in a third phase in which the DC-DC converter 8 operates in a buck mode to reduce the voltage from the supercapacitor 7 to the same voltage as the supply line voltage of the battery 5.

Phase 3: Buck Mode from Supercapacitor to Supply Line

The control unit 12 modulates switch Q1 with a PWM signal and modulates Q2 with a complimentary PWM signal so that Q2 acts as a synchronised rectification diode. The control unit 12 turns switch Q4 on and switch Q3 off.

When the voltage from the supercapacitor 7 drops below the supply line voltage, the control unit 12 controls the DC-DC converter 8 to operate in a fourth phase in which the DC-DC converter 8 boosts the voltage from the supercapacitor 7 to the supply line voltage.

Phase 4: Boost Mode from the Supercapacitor to the Supply Line

The control unit 12 turns the switch Q1 on and the switch Q2 off. The control unit 12 modulates switch Q3 with a PWM command and modulates switch Q4 with a complimentary PWM command so that switch Q4 acts as a synchronised rectification diode.

Figure 4C:
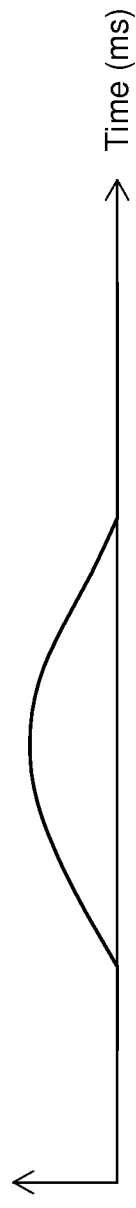
FIG. 4c is a graphical representation of the speed of a motor driven by a drive arrangement of an embodiment of the invention during a crash situation.
Figure 4D:
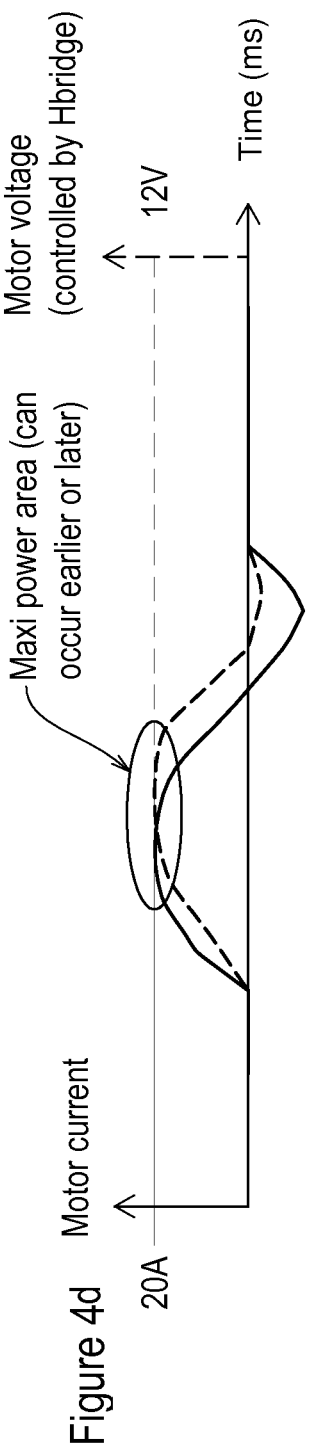
FIG. 4d is a graphical representation of the current flowing through a motor driven by a drive arrangement of an embodiment of the invention during a crash situation.

Referring now to FIG. 4c of the accompanying drawings, the speed of rotation of the motor 18 is controlled by the control unit 12 operating the DC-DC converter 8 in the boost or buck modes to maintain the voltage across the motor 18 at the supply line voltage for as long as possible. The control unit 12 automatically switches the DC-DC converter 8 in response to the sensed power supply line voltage and the sensed voltage across the supercapacitor 7.

In embodiments of the invention, the auxiliary power source in the form of the supercapacitor 7 provides a source of power to a motorized seat belt retractor in the event that the motorized retractor is disconnected from the vehicle's primary power source. In other situations where the motorized retractor is not disconnected from the vehicle's primary power source, the auxiliary power source provides current to supplement the current provided by the primary power source to the motorized retractor. This helps to limit the current drawn from the vehicle's primary power source. The drive arrangement therefore minimises the current spike produced in the vehicle's electrical system by the operation of the motorized retractor.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

While the above description constitutes the preferred embodiment of the present invention, it will be appreciated that the invention is susceptible to modification, variation and change without departing from the proper scope and fair meaning of the accompanying claims.

The invention claimed is:

1. A drive arrangement for driving a motor in a motorized seat belt retractor, the arrangement comprising:
   a power supply input configured to be connected to a primary power source,
   a supercapacitor,
   a bi-directional DC-DC converter circuit configured to operate in a boost converter mode and a buck converter mode, the DC-DC converter circuit having an input that is connected to the supercapacitor,
   a motor driver circuit having a motor driver circuit input that is connected to an output of the single DC-DC converter circuit and to the power supply input the motor driver circuit further comprising an output which is connected to the motor of the motorized seat belt retractor,
   a control unit connected to the single DC-DC converter circuit,
   the control unit being configured to operate in the buck converter mode when the control unit senses that the voltage across the supercapacitor is lower than the voltage of the primary power source, wherein the DC-DC converter circuit reduces the voltage of the primary power source to a lower level and outputs the reduced voltage to the supercapacitor to charge the supercapacitor,
   the control unit being configured to operate in the boost converter mode when the control unit senses that the voltage across the supercapacitor is higher than the voltage of the primary power source, wherein the DC-DC converter increases the voltage of the primary power source to a higher level and outputs the increased voltage to the supercapacitor to charge the supercapacitor,
   the control unit being configured to when the DC-DC converter circuit receives a signal from the crash sensor which is indicative of a crash situation or an anticipated crash situation, the control unit is configured to activate the DC-DC converter circuit to operate in the buck convertor mode when the control unit senses that the voltage across the supercapacitor is higher than the voltage of the primary power source, wherein the DC-DC converter circuit reduces the voltage of the supercapacitor to the lower level and outputs the reduced voltage to the motor driver circuit to drive the motor in the motorized seat belt retractor, and the control unit being configured to when the DC-DC converter circuit receives the signal from the crash sensor which is indicative of a crash situation or an anticipated crash situation, the control unit is configured to operate in the boost converter mode when the control unit senses that the voltage across the supercapacitor is lower than the voltage of the primary power source, wherein the DC-DC converter circuit increases the voltage of the supercapacitor to the higher level and outputs the increased voltage to the motor driver circuit to drive the motor in the motorized seat belt retractor.

2. The drive arrangement according to claim 1, wherein the supercapacitor comprises a plurality of supercapacitor cells.

3. The drive arrangement according to claim 2, wherein a shunt regulator is provided across each of the supercapacitor cells to regulate the voltage and current applied to each of the cells.

4. The drive arrangement according to claim 1, wherein the drive arrangement further comprising a voltage and current limiter to limit the voltage and current input to the supercapacitor.

5. The drive arrangement according to claim 1, wherein the control unit is connected to control switches in the DC-DC converter circuit and the control unit is configured to modulate the control switches in the DC-DC converter circuit so that the DC-DC converter circuit operates in either the buck mode or the boost mode in response to the sensed primary power source voltage and the sensed voltage across the supercapacitor.

6. The drive arrangement according to claim 1, wherein the drive arrangement further comprising a speed sensor to sense the speed of rotation of the motor and output a speed signal to the control unit which is indicative of the speed of rotation of the motor.

7. The drive arrangement according to claim 1, further comprising wherein the motor driver circuit is an H-bridge motor driver circuit.

8. The drive arrangement seat belt retractor according to claim 1, further comprising wherein the seat belt retractor is operable as a load limiter.

* * * * *